Fig. 3

April 17, 1951   J. R. THOMAS   2,548,920
VARIABLE PRESSURE-RESPONSIVE TORQUE CONTROL
FOR HYDRAULIC CLUTCHES
Filed Oct. 22, 1946   7 Sheets-Sheet 4

Inventor
John R. Thomas
by Frank J. Schraeder
Attorney.

April 17, 1951 J. R. THOMAS 2,548,920
VARIABLE PRESSURE-RESPONSIVE TORQUE CONTROL
FOR HYDRAULIC CLUTCHES
Filed Oct. 22, 1946 7 Sheets-Sheet 6

Inventor
John R. Thomas
by Frank J. Schraeder Jr.
Attorney.

April 17, 1951  J. R. THOMAS  2,548,920
VARIABLE PRESSURE-RESPONSIVE TORQUE CONTROL
FOR HYDRAULIC CLUTCHES
Filed Oct. 22, 1946  7 Sheets-Sheet 7

Inventor
John R. Thomas
by Frank Schraeder Jr.
Attorney.

Patented Apr. 17, 1951

2,548,920

UNITED STATES PATENT OFFICE 2,548,920

VARIABLE PRESSURE-RESPONSIVE TORQUE CONTROL FOR HYDRAULIC CLUTCHES

John R. Thomas, Wichita, Kans., assignor to Thomas Hydraulic Speed Controls, Inc., Wichita, Kans., a corporation of Kansas Application October 22, 1946, Serial No. 704,843

15 Claims. (Cl. 192—61)

This invention generally relates to novel improvements in variable speed hydraulic clutches and more particularly to the valve means for controlling fluid circulation through the fluid pumping means thereof and also particularly to fluid pressure-responsive torque control means therefor.

This invention relates to, and has among its objects the provision of, novel valve control means for variable speed hydraulic clutches of the type shown in Reissue Patent No. 22,577 wherein two fluids of different resistant value, such as oil and air, are employed in variable mixtures as well as independently, and wherein the control of the independent fluids or of mixtures of relatively varied proportions thereof is effected through novel valve means adapted for metering or arresting the flow of the fluids in the fluid circuit extending through a fluid circulating instrumentality such as, for example, a gear type pump carried by the casing.

The invention is directed to novel controls for fluid clutch operated devices and apparatus such as, for example, balanced load hoisting apparatus for hoisting, balancing and spotting loads such as fabricated structural parts, various mechanisms and elements in various industrial manufacturing and assembly plants.

One of the objects of the invention is to provide a variable speed hydraulic clutch wherein a single control valve heretofore directly connected to extraneously disposed control means is presently indirectly connected to extraneously disposed control means so as to provide, in and through such indirect connection, means for automatically maintaining a constant torque being delivered to the driven shaft regardless of the speed of rotation or non-rotation of the driven shaft.

Another object of the invention is to provide adjustable and automatically self-compensating supplemental control means between the hydraulic clutch control valve means and the usual manually operable control lever whereby the automatic supplemental control means will cause the hydraulic clutch to deliver and maintain a predetermined constant torque after the manually operable control lever has been released from a manually shifted position to cause the hydraulic clutch to deliver a greater or lesser torque than said predetermined torque.

Another object of the invention is found in the provision of means adapted for controlling a hydraulic clutch, of the type, for example, shown in Reissue Patent No. 22,577, in such manner that a selectively variable predetermined torque is delivered to the driven shaft and automatically maintained without the use of auxiliary pressure-relief valves, said means being coaxially disposed and not affected by centrifugal forces.

Another object of the invention is to provide, in a hydraulic clutch control, means for adjusting the phase of valve intake control relative to valve exhaust control, without changing the normal fixed relationship of valve seat intake and exhaust ports, to thereby vary the characteristics of load engagement of the hydraulic clutch.

Still another object of the invention is to provide in a hydraulic clutch operated mechanism, a supplemental automatic control interposed between a hydraulic clutch control valve and a manually operable clutch valve control lever, a pressure-responsive work piston actuable by the static working pressure of the hydraulic clutch, said piston being operatively connected to the hydraulic clutch control valve and responsive to increase or decrease in the static working pressure to correspondingly change the valve setting and thus automatically maintain a constant torque on the clutch driven shaft.

Still another object of the invention is to provide, in a supplemental automatic control, means for scavenging the cylinder of a fluid pressure responsive piston so that static working pressure will actuate the piston only after a hydraulic clutch control valve has been moved to a control position whereat the circulated fluid in the clutch being initially air and thereafter mixtures of air and oil has become substantially that of oil to the extent that the action of the piston in the cylinder is positive instead of being "spongy or inaccurate" as would be the case if the circulated fluid were substantially that of air.

A further object of the invention is to provide in a hydraulic-clutch-operated power-transmitting mechanism, supplemental automatic control means including a fluid-pressure-responsive piston and cylinder therefor interposed between a hydraulic clutch control valve and a manually or otherwise extraneously operable valve control lever, such supplemental means being disposed within the clutch casing and operatively connected to the extraneous valve control lever and including means permitting fluid under working pressure to escape from the piston cylinder back to the clutch fluid reservoir instead of flowing to a seal element mounted on such operative connection to the extraneous valve control lever, thus eliminating the need for a high pressure seal.

A further object of the invention is found in the provision of a control system including a pressure gauge communicating with the static pressure of the fluid circuit of a hydraulic clutch interposed between a prime mover and a driven shaft. Since the static pressure of the hydraulic clutch is proportionately relative to the torque transmitted to the driven shaft, said control system includes a fluid pressure actuated gauge calibrated in inch-pounds, foot-pounds or pounds cable pull providing visual indication of the work being done by the clutch.

A still further object of the invention is to provide, in addition to adjustable means for selectively predetermining and automatically maintaining the constant torque transmitted to a driven shaft by a hydraulic clutch, an auxiliary control lever for momentarily manually changing the torque value for the purpose of varying the speed of the driven shaft whereby, upon release of such auxiliary control lever, the torque instantaneously returns to the predetermined constant torque value.

The various features of novelty whereby the present invention is characterized will hereinafter be pointed out with particularity in the claims; but, for a full understanding of the invention and of its various objects and advantages, reference may be had to the following detailed description taken in connection with the accompanying drawings exemplifying a preferred embodiment of the invention which is now considered to be the best mode for applying the novel principles of the invention.

In the drawings wherein like reference numerals designate like or corresponding parts.

Figure 1:
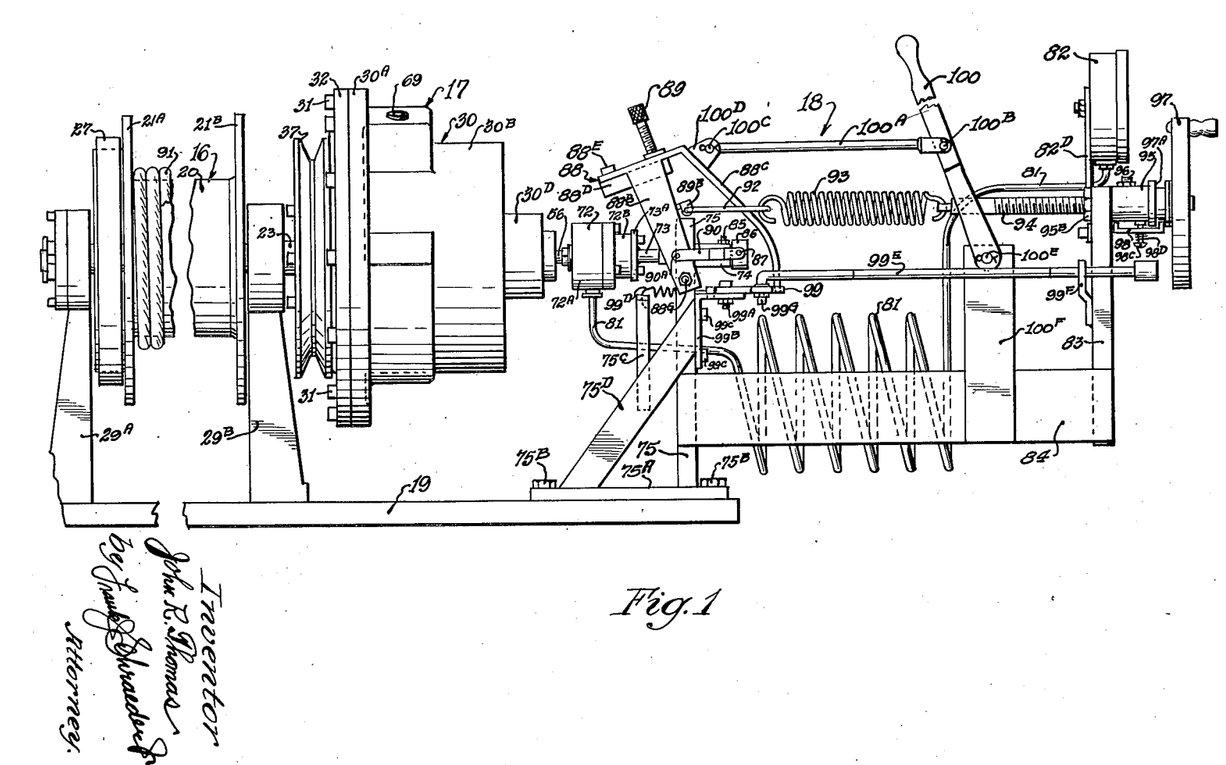
Fig. 1 is a side elevation of my novel hydraulic clutch operatively connected to a hoist drum and including a variable pressure responsive control system embodying my invention.
Figure 2:
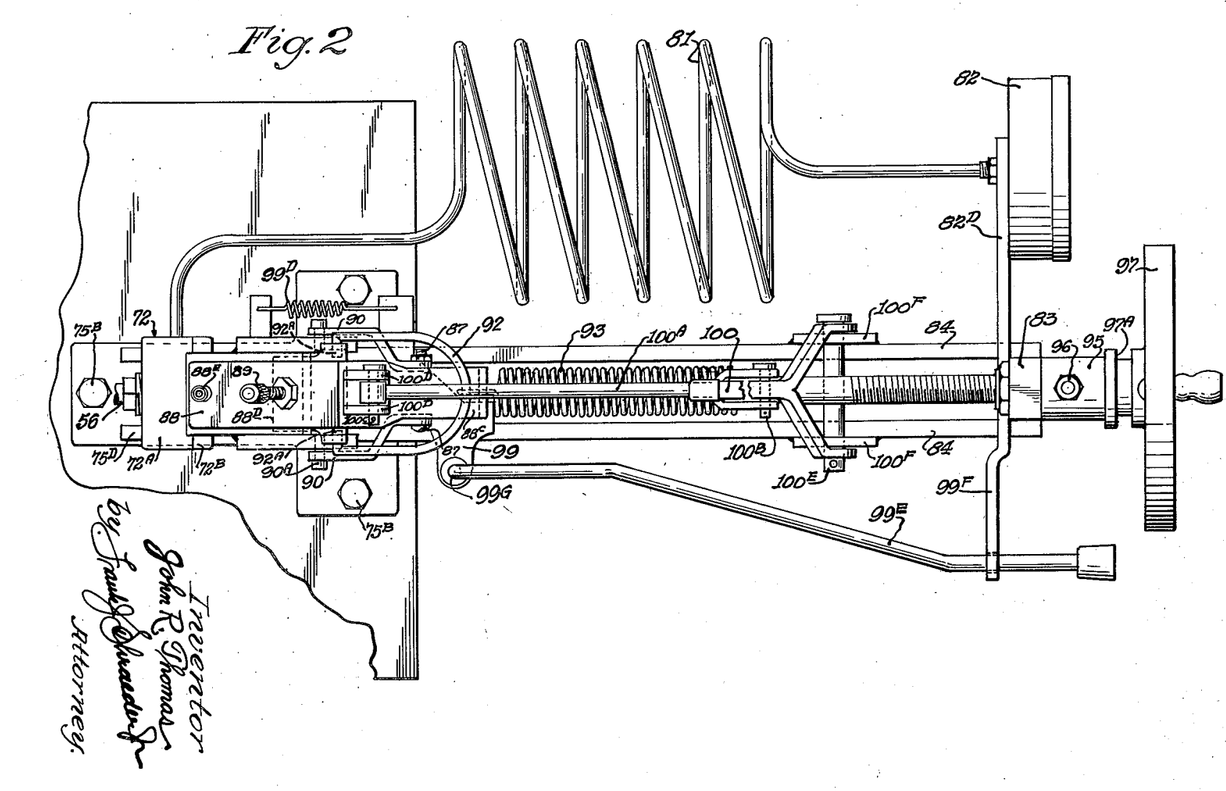
Fig. 2 is a top plan view of a portion of the novel constant torque control system shown in Fig. 1.

In the attached drawings, my invention is shown preferably in its application to a simple form of hoisting apparatus which as illustrated in Fig. 1 consists of three major elements such as the hoist drum or reel 16, a hydraulic power-driven clutch 17 and the control devices 18; the hoist drum 16 and control devices 18 are shown as mounted on a base 19.

Figure 3:
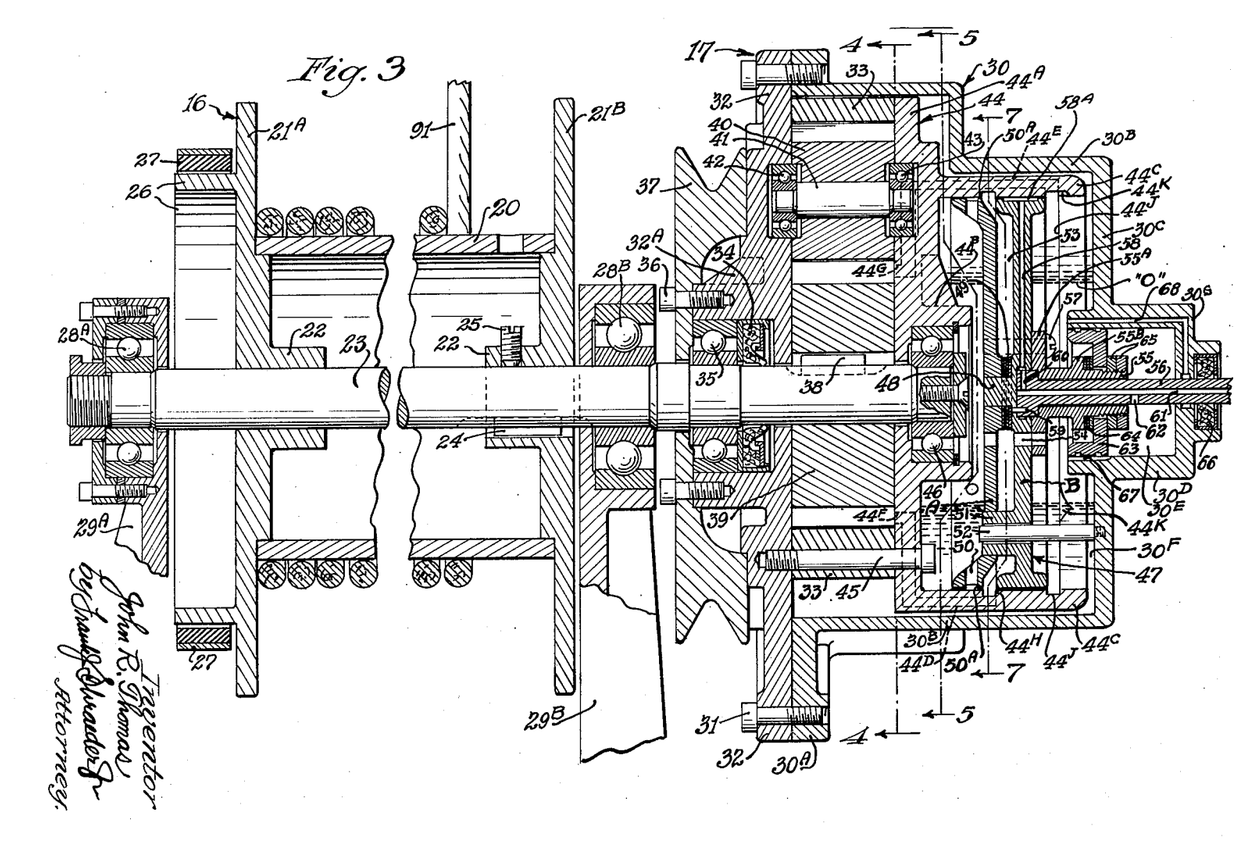
Fig. 3 is a longitudinal section through the novel hydraulic clutch showing same operatively connected to the hoist drum and to the automatically operable constant torque control.

The hoist drum 16, as more clearly shown in Figs. 1 and 3, consists of a hollow cylindrical wall 20 rigidly secured in any suitable manner, as by welding, to the circular flange ends 21$^A$ and 21$^B$ which are provided with integral hubs 22 secured to the output or driven shaft 23 as by the key 24 and set screw 25; the flange 21$^A$ being shown as provided with an integral circular brake drum 26 which is engageable by the brake band 27 of a suitable automatic electric brake mechanism or hand-operable brake mechanism (not shown) for use in holding a load for an indefinite long period of time or for emergency brake application in the event of power failure.

The driven shaft 23 is rotatably supported in ball bearings 28$^A$ and 28$^B$ carried in the upper ends of the bearing stands, respectively, 29$^A$ and 29$^B$.

The hydraulic clutch, generally designated by numeral 17, comprises a rotatable casing 30 of somewhat transversely triangular configuration and is provided with a circular integral flange 30$^A$ connected, as by screws 31, to a circular outer end plate 32 which functions as an outer closure wall for the clutch casing 30 and for one side of the pump body 33.

As more clearly shown in Fig. 3, the end plate 32 is provided with a hub 32$^A$ carrying therein a fluid seal 34 and a ball bearing 35 which is carried on the driven end of the driven drum shaft 23 on which the casing 30 is supported. Secured by screws 36 to the outer face of the outer end closure plate 32 is a pulley 37 adapted to be belt-driven by a prime mover such as an electric motor.

The clutch-driven end of the driven shaft 23 extends through the end closure plate 32 into the pump body for connection, as by the key 38, to the sun gear 39 which is mounted in a transverse cavity of the pump body defined by the arcuate walls 33$^A$ spaced between openings of cavities 33$^B$ for the planet gears 40 which are suitably secured to their supporting pins 41, the ends of each pin being rotatably supported at one end in a ball bearing 42 carried on the outer end closure plate 32 and at the opposite end in a ball bearing 43 carried on the inner closure plate 44 which functions as an inner closure wall for the gear pump body 33 and also as a combined unitary manifold plate and valve seat.

Figure 4:
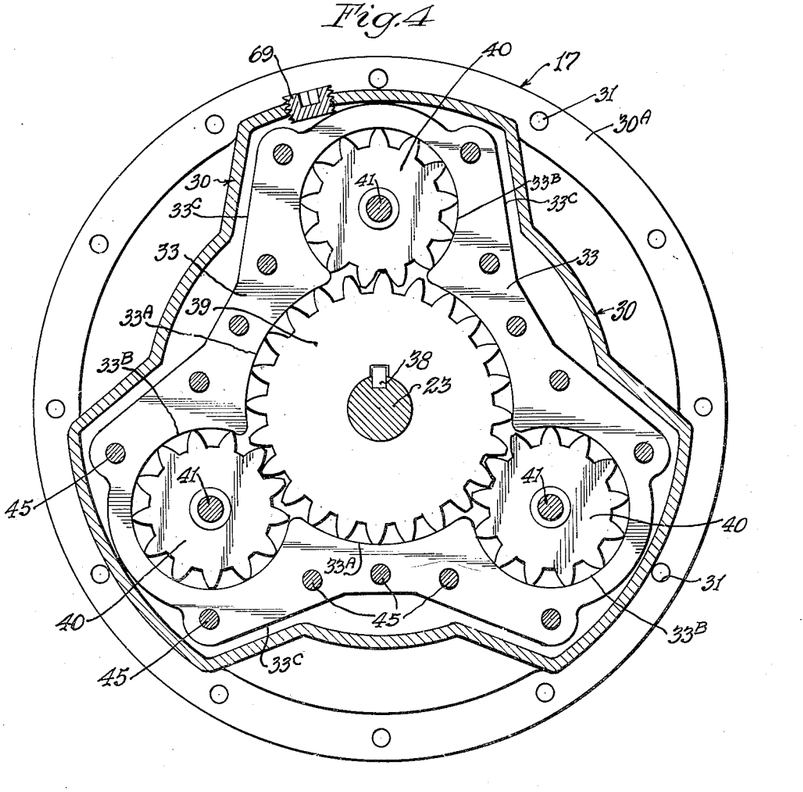
Fig. 4 is a cross section through the hydraulic clutch taken on line 4—4 of Fig. 3.

As more clearly shown in Figs. 3 and 4, the flat parallel faced pump body is shown as of a generally triangular configuration to decrease the weight of the clutch and is defined by the peripherally transversely disposed edge face designated by numeral 33$^C$, being simply large enough in area to accommodate the cavities 33$^B$ for the planet gears 40.

The diametrically disposed wall portion 44$^A$ of the inner closure wall 44 is contoured like the pump body to align with and fit over same, and the pump body 33 is secured between and to the outer wall plate 32 and to the inner wall plate 44 by screws 45.

The wall portion 44$^A$ is provided with a hub portion 44$^B$ which carries a ball bearing 46 in which the terminal end of the driven shaft 23 is rotatably positioned.

Figure 7:
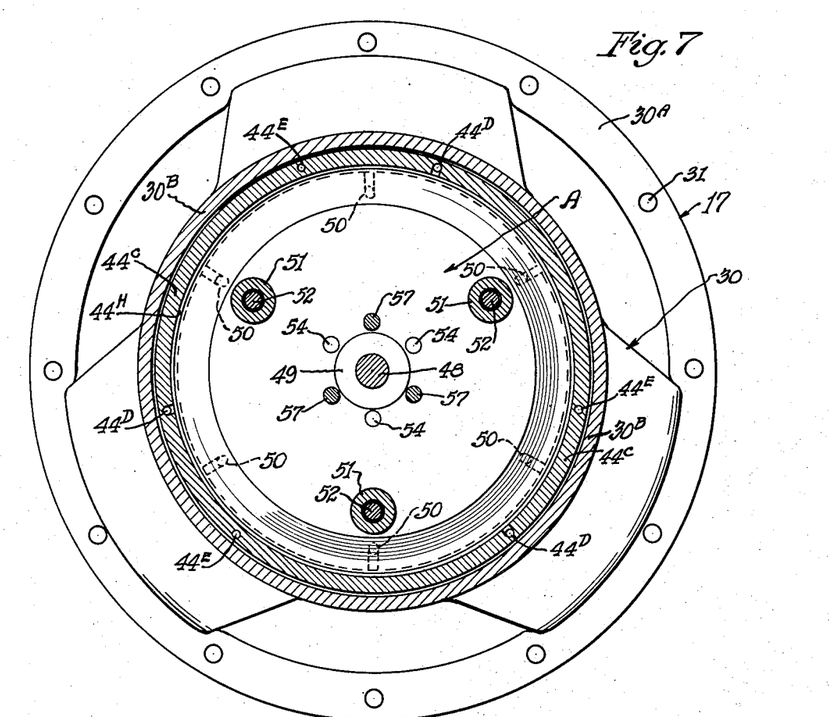
Fig. 7 is a cross section of the hydraulic clutch taken on line 7—7 of Fig. 3.
Figure 8:
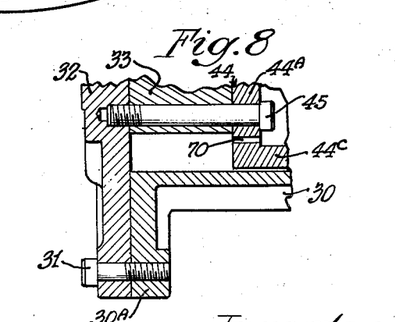
Fig. 8 is a section taken on line 8—8 of Fig. 5.

Formed integrally with the plate portion 44$^A$ is a cylindrical valve seat 44$^C$ which extends into and is housed within the clutch casing wall portion 30$^B$ and 30$^C$ shown also of similar configuration to that of the inner plate portion 44$^A$ in Figs. 5 and 7; the diametrically or transversely disposed casing wall portion 30$^C$ being provided with an integral cylindrical cup-shaped housing 30$^D$ for a fluid pressure responsive chamber 30$^E$ which will later be more fully described.

The fluids within the casing 30 circulate through the gear pump around the sun and planet gears, there being three intake ports 44$^D$ and three discharge ports 44$^E$ within the portions 44$^A$ and 44$^C$ of the inner plate 44, the ports being arranged in pairs and their openings, one for the intake port 44$^D$ and one for the discharge port 44$^E$, being located at opposite sides of a center line passing through the centers of a planet gear and the sun gear and near the intersections of the addendum circles thereof. In Fig. 5, the pair of intake and discharge openings at the inner face of the wall 44$^B$ near each planet gear are designated respectively by 44$^F$ and 44$^G$.

Figure 5:
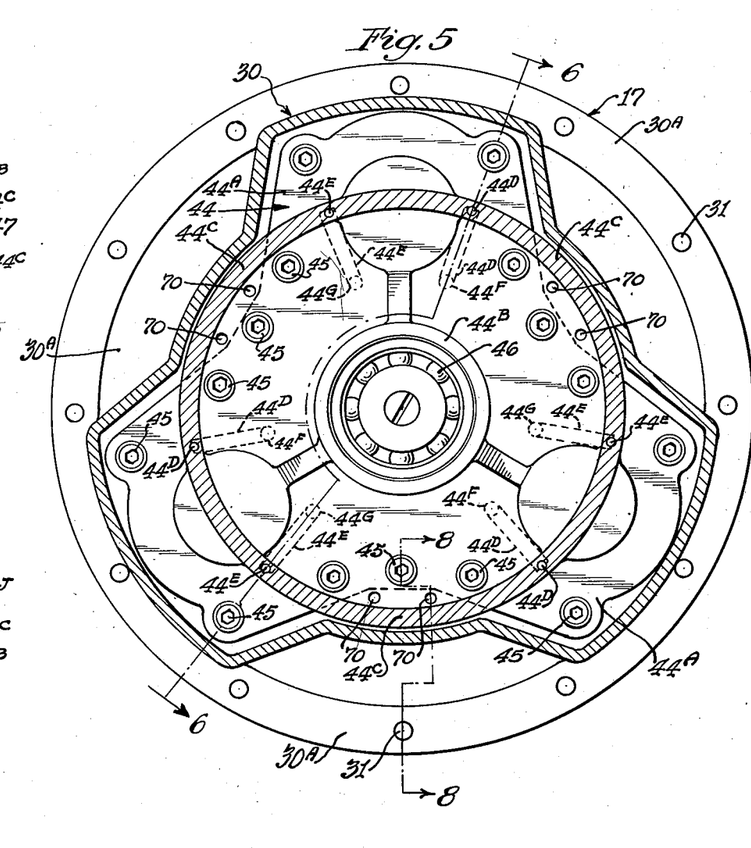
Fig. 5 is a cross section through the hydraulic clutch taken on line 5—5 of Fig. 3.
Figure 6:
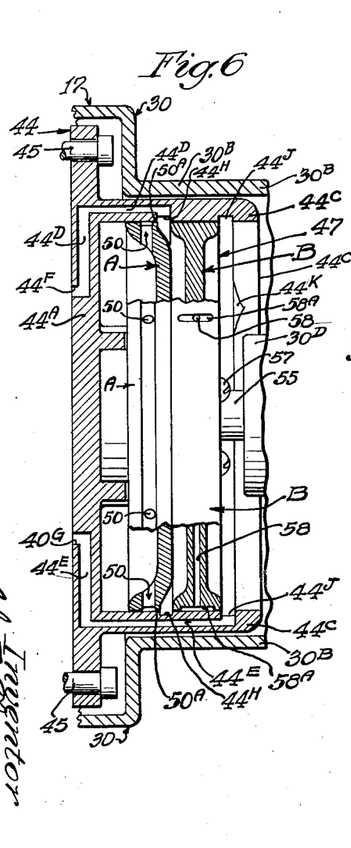
Fig. 6 is a section taken on line 6—6 of Fig. 5.

As more clearly shown in Figs. 3, 5 and 6, the three pairs of fluid intake and discharge ports 44$^D$ and 44$^E$ extend from their respective openings 44$^F$ and 44$^G$ substantially radially outwardly within the wall portion 44$^A$ and thence axially of the clutch within the wall of the valve seat portion 44$^C$ into open communication with the annular pressure stabilizing grooves, respectively 44$^H$ and 44$^J$, cut into the inner face of the valve seat portion 44$^C$.

The flow of air, or of relatively varied proportionate mixtures of air and oil, or of only oil, or of neither, through the intake ports 44$^D$, through the power transmitting gear pump, and through the discharge ports 44$^E$ is controlled by a cylindrical valve, generally designated by numeral 47, movably mounted within the valve seat 44$^C$ which extends into the fluid chamber 30$^F$ housed within the casing wall portions 30$^B$ and 30$^C$ and which chamber 30$^F$ is partially filled with oil, or any other suitable fluid, so that when the clutch casing rotates the oil is forced by centrifugal force to assume a ring-shaped body or annulus in the outer portion of the casing chamber 30$^F$ and thereby surrounds a central core of air in the central portion of the chamber 30$^F$. The inner circular face of the oil annulus is indicated in Fig. 3 by "O."

Oil, or any suitable fluid, is introduced into the clutch casing 30$^F$ through a fill plug 69, shown in Fig. 4; the oil passing around the pump body 33, around the manifold plate 44 and between the valve seat portion 44$^C$ and casing wall portion 30$^B$. Only a sufficient quantity of oil is introduced into the clutch casing to create, during its rotation, an oil annulus of the depth shown in Fig. 3 to provide a central core of air of the diameter designated in Fig. 3 by "O." The oil has access to both sides of the valve 47 by passing around the outer end of the valve seat 44$^C$ and by passing through the openings 70 shown in Figs. 5 and 3.

The clutch control valve 47 consists of two parts designated by A and B, the parts being axially and peripherally aligned and the part B being provided with a centrally disposed cylindrical extension 48 fitted into a central opening in part A and the extension 48 extending through a plurality of shim stock pieces consisting of thin perforated circular washers 49 which retain the parts A and B in selectively adjusted spaced position. These shims 49 afford phase adjustment to vary the control effects of the assembled valve unit.

The annular peripheral flange portion of the control part A is provided with a plurality of circularly spaced oil inlet openings 50 which are adapted progressively to register with the valve seat oil inlet pressure stabilizing groove 44$^H$ and to meter the flow of oil into the pump intake ports 44$^D$ which have their inlet openings in communication with the groove 44$^H$.

The fluid discharge ports 44$^E$ are in open communication at their discharge ends with the pressure stabilizing groove 44$^J$ and the groove 44$^J$ and fluid discharge being adapted to be partially and fully closed by the comparatively wide peripheral face of the valve part B.

To insure further the alignment of the valve parts A and B and the conjoint rotation of the valve 47 with the clutch casing, the valve part B is provided with three integral bosses 51 which extend through closely fitting openings in the valve part A. When the valve 47 is axially movable it is guided by the three rods 52 which are screw-connected at their outer ends with the casing wall portion 30$^C$ and their inner ends slidably extending through the bosses 51.

Between the valve parts A and B and surrounding circular shim spaced connection between the parts A and B is a constantly open annular air passage 53 which extends outwardly to provide a peripherally disposed circular air discharge opening between the peripheral faces of the parts A and B. It may now be noted that the peripherally disposed circular air discharge opening is in all instances separated from the edges of the oil inlet openings 50 by a very thin wall 50$^A$ of a thickness of about one thirty-second of an inch.

The annular air passage 53 is provided with a plurality of circularly spaced axially disposed constantly open air inlet openings 54 which extend through both valve parts A and B and intersect the diametrically disposed annular air passage 53, the air inlet openings 54 extending through the flange 55$^A$ of a sleeve 55 in which is positioned the valve operating rod 56.

The flange 55$^A$ carries a plurality of screws 57 which serve to connect the two valve parts A and B to the flange 55$^A$ of the sleeve 55.

The valve part B is also provided with preferably three radially disposed circularly equally spaced clutch working pressure communicating passages 58 which extend from axially disposed slots 58$^A$ in the peripheral face of valve part B inwardly radially to an annular pressure stabilizing groove within a central opening in the part B in which is disposed the inner flanged end of the valve operating rod 56.

To insure conjoint rotation of the valve operating rod 56 with the clutch casing and valve 47, the valve part B carries at least one pin 59 which extends into the inner flange of the operating rod 56.

The annular pressure stabilizing groove connecting the inner ends of the radially disposed clutch fluid working pressure communicating passages 58 surrounds the peripheral face of the inner flange of the operating rod and communicates with at least one port 60 the inner end of which communicates with the clutch fluid working pressure communicating passage 61 extending longitudinally of the valve operating rod 56. A port 62 provides an opening for passage therethrough of the clutch fluid working pressure into the fluid pressure responsive piston chamber 30$^E$ in which is slidably mounted a comparatively small fluid pressure responsive piston 63.

The piston 63 is mounted over the threaded end of the sleeve 55 between a plurality of shim washers 64 and is secured to the sleeve 55 by a pair of nuts 65 which secure the piston 63 and shims 64 against the medial flange 55$^B$ of the sleeve 55. The shims 64 permit adjustment of the phase relationship of the piston 63 to its closing movement of the scavenging duct 67. Since during neutral clutch operation, with the valve 47 in the position shown in Fig. 3 only air is circulated through the pump ports, and providing the piston chamber 30$^E$ were not filled with oil, then the air that would fill same could not escape and hence the provision of the scavenging duct 67 which also acts to overcome any dash pot action.

The valve operating rod 56 is slidably extended through the transverse wall 30$^G$ of the fluid pressure responsive piston chamber 30$^E$ which is provided with a packing 66. The transverse piston chamber wall is recessed around the valve operating rod inwardly of the packing 66 and a fluid relief passage 68 provides escapement into the casing oil chamber 30$^F$ of any oil blowing around the valve operating rod in its guide-fit within the transverse wall 30$^G$.

As stated above, the valve 47 is shown in Fig. 3 in neutral clutch operating position wherein no power is transmitted to the hoist drum shaft 23 since only air is being admitted through the air passage 53 into the intake ports 44$^D$. As the valve is progressively moved toward the right, as viewed in Fig. 3, the narrow circular closure wall face 50$^A$ will move across the intake ports 44$^D$ and will progressively admit an increasing volume of oil through the oil openings 50 into admixture with the stream of air passing into the intake ports 44$^D$ while the flow of air is simultaneously being decreased until when the oil inlet openings 50 register with the intake ports 44$^D$ only oil will be admitted into the intake ports 44$^D$. During such valve movement from neutral air operation to oil operation, the clutch will have transmitted a progressively increased speed and power to the hoist drum 16. Also, during such valve movement the wide face of the clutch part B will have progressively closed the discharge ports 44$^E$ so that the clutch casing and hoist drum 16 are rotating at practically the same speed, thus the speed and power transmitted from a prime mover by a belt drive to the clutch casing pulley 37 is controllably transmitted by the clutch under the control of the valve 47 to the hoist drum 16. A load to be lifted by the hoisting rope 71 may be raised and lowered by the axial movements of the valve 47 by the operating rod 56, the movements of the valve increasing and decreasing the torque transmitted to the hoist drum 16, and when hoist drum demand torque equals the hydraulic clutch torque the load is balanced.

Figure 9:
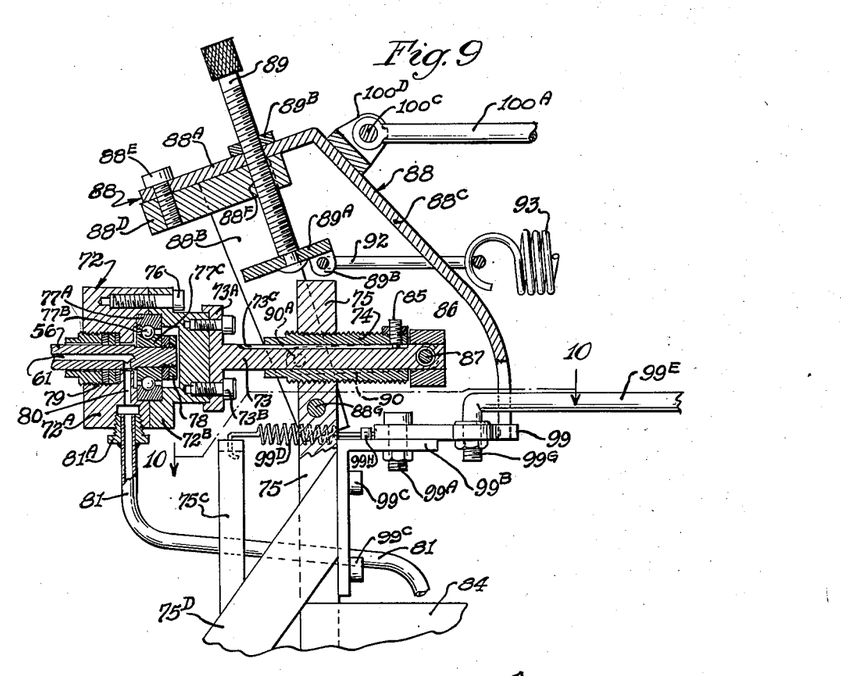
Fig. 9 is a longitudinal section through a portion of the pressure responsive control system.

As more clearly shown in Figs. 1 and 9, the clutch valve operating rod 56 extends into operative connection with a non-rotatable head 72 of an axially aligned shaft 73 which is mounted for longitudinal sliding movement in an externally threaded sleeve 74 having adjustably threaded support in the upper end of a stationary post 75 extending in upright position from its base 75$^A$ secured by screws 75$^B$ to the main base 19, the non-rotatable head 72 consisting of two separate main parts 72$^A$ and 72$^B$ secured together by screws 76 and rigidly securing between them the outer race 77$^A$ of a ball bearing 77$^B$ while the inner race 77$^C$ is secured to the threaded terminal end of the valve operating rod 56, as by the nuts 78, and rotatable with it. The ball-bearing 77$^B$ functions as a slip ring between the head 72 and the operating rod 56.

Since the valve operating rod 56 is rotatable in and relative to the head 72 a suitable packing 79 is provided in the head port 72$^A$.

As shown in Fig. 9, the clutch fluid working pressure communicating passage 61 opens transversely at its end into communication with a port 80 in the head part 72$^A$ with which is screw-connected the fluid pressure inlet connection 81$^A$ of a flexible coiled conduit 81 which extends into communication with the fluid pressure gauge 82 carried on the bar 82$^D$ secured to an upright member 83 supported between the outer ends of a pair of parallel bars 84 which are secured at their inner ends of the post 75.

Figure 12:
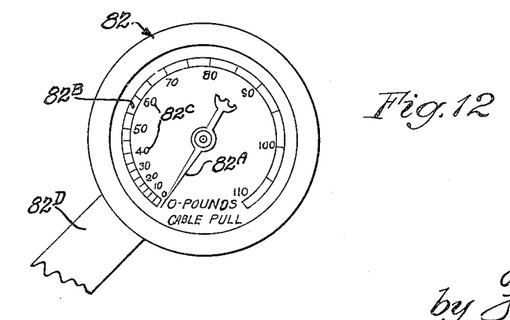
Fig. 12 is a front view of the gauge for indicating the power transmitted by the hydraulic clutch.

The dial of the clutch hydraulic pressure indicating gauge 82 is shown as provided with an indicator arrow 82$^A$ adapted to register with the calibrated scale 82$^B$ having indicia 82$^C$ which in the present illustration designate the pull in pounds of the hoist rope or cable 91.

The hoist drum 16 is shown as of indefinite length, in its use as part of a balanced-load hoist to which this invention is particularly adaptable, and to provide for proper operative function in connection with the herein disclosed automatic control system, the load hoisting cable must follow in winding upon the drum a single layer usage for, obviously, if the cable fills the full length of the drum and overlapping in one or more layers thereon, the torque required to balance the cable load will be increased in amount corresponding to the increased length of the radial arm from the center of the driven shaft to the center of any such additional layer of cable.

The longitudinally slidable shaft 73 is provided with a flange 73$^A$ which is rigidly secured to the head part 72$^B$ as by screws 73$^B$ and the slidable shaft 73 is held against rotation by means of the longitudinal keyway 73$^C$ into which extends the inner end of a half-dog set screw 85. The longitudinal sliding movement of the shaft 73 is limited by the engagement of the flange 73$^A$ with the inner end of the sleeve 74, the collar 86 being secured to the shaft 73 by a cross bolt 87. The longitudinal adjustment of the threaded sleeve 74 in the post 75 facilitates proper positioning of the operating rod 56 and valve 47 with respect to the clutch casing and driven shaft 23.

A yoke generally designated by numeral 88 is provided and consists of a flat transverse portion 88$^A$ having integral side arms 88$^B$ and an angular downwardly disposed integral clutch neutral operation locking foot 88$^C$. The cross-sectional thickness of the flat transverse portion 88$^A$ is preferably increased by a flat bar 88$^D$ rigidly connected to the portion 88$^A$, as by screw 88$^E$, to thereby accommodate a threaded opening 88$^F$ for the adjustable screw 89.

The parallel side arms 88$^B$ are pivotally mounted on a cross bolt 88$^G$ carried in the post 75 and the side arms 88$^B$ are operatively connected to the shaft 73 by two links 90 pivotally connected at corresponding ends by screws 90$^A$ to the side arms 88$^B$ and at their opposite ends to the crossbolt 87 at the collar 86, thus the movements of the clutch valve 47, its operating rod 56 and the slidable shaft 73 are operatively connected to the pivotal movements of the yoke 88 about the pivot bolt 88$^G$; in other words, any motion transmitted to the yoke 88 is transmitted to the clutch fluid control valve 47.

Fixed to the lower end of the adjustable screw 89 is a leverage adjustment bar member 89<sup>A</sup> which is provided with a pair of ears 89<sup>B</sup> to which the opposed spaced ends 92<sup>A</sup> of a bail 92 are pivotally connected, the opposite arcuate end of the bail being pivotally connected to one end of a suitable coil spring 93 the opposite end of which is pivotally connected to a longitudinally adjustable threaded stem 94.

Figure 11:
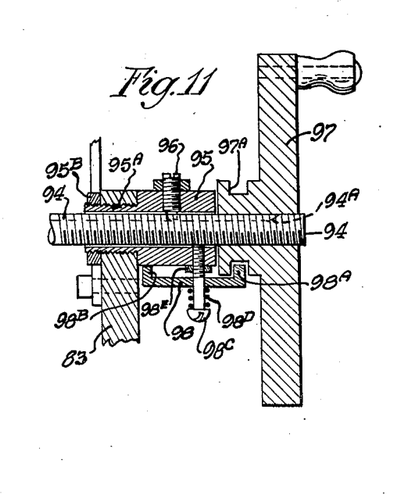
Fig. 11 is a vertical section through the manually operable hand wheel for adjusting the automatic control.

The longitudinally movable spring tension adjustment stem 94 is non-rotatably mounted in a supporting sleeve 95 which carries a half-dog set screw 96 which engages within a keyway 94<sup>A</sup> and prevents rotation of the stem 94, the sleeve 95 having a threaded end portion 95<sup>A</sup> which is securely screwed into the upper end of the upright member 83 and locked thereto by the nut 95<sup>B</sup>. A hand-wheel 97 in threaded connection with the outer end of stem 94 is rotatably mounted adjacent the outer end of the sleeve 95. A clockwise rotation of the hand-wheel will cause an outward sliding movement of the stem 94, the hand-wheel 97 being provided in the hub thereof with an annular groove 97<sup>A</sup> which is constantly engaged by one flanged end 98<sup>A</sup> of a spring-pressed retainer member 98 which is medially loosely mounted on a screw 98<sup>C</sup>, the opposite flanged end 98<sup>B</sup> engaging the side of the sleeve 95. The retainer 98 is yieldingly supported on a coiled spring 98<sup>D</sup> one end of which abuts with the outer face of the retainer member 98 and the other with the head of the screw 98<sup>C</sup> which is adjustably threaded into the sleeve 95 for support thereon and locked thereto by the lock nut 98<sup>E</sup>. When the screw 98<sup>C</sup> is turned, it varies the pressure of the spring 98<sup>D</sup> against the retainer 98 and thereby varies frictional pressure of the latter against the hand-wheel 97, and the retainer 98 functions mainly to retain the hand-wheel 97 against movement from the adjacent sleeve 95 while it is rotated to move the stem 94 longitudinally within the sleeve 95 in adjusting the tension of the spring 93.

Figure 10:
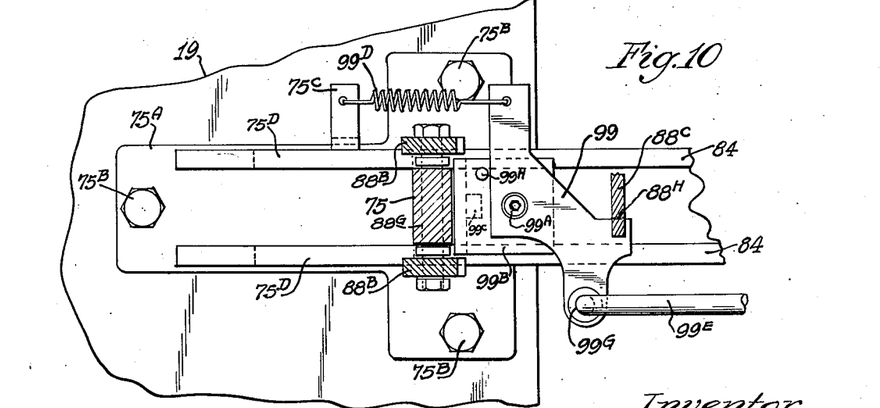
Fig. 10 is a horizontal section taken on line 10—10 of Fig. 9.

As shown in Figs. 1, 9 and 10, the yoke 88 is positioned for neutral clutch operation to correspond to the neutral position of the clutch control valve 47 as shown in Fig. 3 and the control devices are shown with the yoke 88 latched to maintain such neutral operation of the clutch.

The lower end of the clutch neutral operation locking foot 88<sup>C</sup> is notched as at 88<sup>H</sup> for engagement therein of a laterally movable latch 99 which is pivotally mounted on the bolt 99<sup>A</sup> carried in the horizontal leg of the latch-supporting angle iron 99<sup>B</sup> which is secured, as by screws 99<sup>C</sup>, to the post 75, and the latch 99 is yieldingly held normally by the spring 93 in locking engagement with the notched end of the locking foot 88<sup>C</sup> of the yoke 88 by a coiled spring 99<sup>D</sup> one end of which is connected to an arm portion of the latch 99 and its opposite end connected to a rigid bar 75<sup>C</sup> fixed to and supported from the brace 75<sup>D</sup>.

The latch 99 is provided with a clutch neutral operation release rod 99<sup>E</sup> which is slidably supported at its free operating end in a bracket bar 99<sup>F</sup> fixed at one end to the upright 83, the opposite end of the release rod 99<sup>E</sup> being pivotally connected, as at 99<sup>G</sup>, to an arm portion of the latch 99.

Permissive manual operation of the above-described selectively adjustable and automatically operable constant torque control system is provided in the hand lever 100 the lower bifurcated end of which is pivotally supported, as on pin 100<sup>E</sup>, carried on the upper ends of the bars 100<sup>F</sup>, the lower ends of which bars are secured to the parallel bars 84. The clutch valve operating hand lever 100 is operatively connected to the yoke 88 by a link 100<sup>A</sup> having a bifurcated end pivotally connected to a pin 100<sup>B</sup> carried by the hand lever 100 and having its opposite end trunnioned on a pivot pin 100<sup>C</sup> carried in a pair of ears 100<sup>D</sup> rigidly fixed to the yoke locking foot 88<sup>C</sup>.

Since the yoke 88 is operatively connected by the pair of side links 90 to the shaft or stem 73 which, from the preceding description is described as operatively connected to the valve operating rod 56 through the interconnecting slip ring containing head 72, the clutch valve 47 is at all times available for manual operation by the hand lever 100 after the yoke latch 99 has been shifted by the release rod 99<sup>E</sup>, against the pressure of its spring 99<sup>D</sup>, to release the yoke 88 and permit it to be moved by the hand lever 100, it being understood that such manual operation of the clutch valve is permissible as long as the clutch valve 46 is not moved by the hand lever 100 to neutral position whereat the yoke 88 would become automatically locked therein by the release of the latch 99 from its engagement with the side edge of the locking foot 88<sup>C</sup> to thereby permit the latch to be moved by the pressure of its spring 99<sup>D</sup> into locked position within the notch end of the foot 88<sup>C</sup>.

It should be noted that the scavenging port 67 is a necessary provision for the pressure responsive chamber 30<sup>E</sup>, inasmuch that, during periods of neutral operation of the clutch, only air is circulated through the pumping means and therefore during such neutral operation the air would fill the piston chamber 30<sup>E</sup> if it was not full of oil at the start of operation, which certainly cannot be assumed and therefore the provision of the scavenging port 67 overcomes any possible dash pot action since any air within the chamber 30<sup>E</sup> is permitted to be exhausted therefrom by an inflow of oil, the scavenging port also functioning to provide an escapement path for air-oil mixtures because such port is not closed by the piston 63 until the valve part A has progressed in its travel and therefore the instant of the closure of such scavenging port is determined with relation to the function of the valve part A during the change from air to oil operation by means of the shim adjustment provided in the piston 63. For example, the thickness of the shims in the piston 63 may be such that when the valve part A moves a distance equal to the full diameter of the valve seat intake ports 44<sup>D</sup> plus the width of the face 59<sup>A</sup>, at which time only oil will be circulated through the pumping means, the piston 63 will have completely closed the scavenge port 67. It will now be apparent that at such instant closure of the scavenge port pressure-responsiveness is available. If, however, the adjustment nuts 65 are backed off and more shims are added the work cylinder will then be pressure-responsive to air-oil mixtures which may be required if initial loads require a torque low enough for the torque produced by an air-oil mixture.

It will be noted that there is an additional set of shims, namely, those interposed between the valve parts A and B and obviously any adjustment of the phase in the clutch valve 47 will necessitate a compensating adjustment of the shims in piston 63 with relation to its movement in closing the scavenging port 67 and therefore there is a definite relationship between the closing of the scavenging port in relation to the closing of the intake ports 44ᴰ by the valve part A and it therefore may be stated that the closure of the scavenging port 67 is not directly connected with the function of the valve part B. It is of course obvious that if some of the shims are removed from the piston 63 the closing of the scavenge port 67 will be retarded which may be desirable in certain cases where full manual control is desired in the lower torque range operations of the clutch whereat pressure-responsiveness may be placed into initial operation at higher ranges of torques and therefore the degree of retardation in pressure-responsive action is thus controlled by the number and thickness of the shims employed in the piston 63.

It may also be noted that with the control valve shown in neutral position as illustrated in Fig. 3, the fluid intake control part of the valve is fully open to air operation. A wall designated by numeral 50ᴬ of about one thirty-second of an inch thick separates the valve air intake passage from the valve oil inlet openings 50, this comparatively narrow wall thickness can however be modified in its thickness and face width according to the desired operation; in other words, the thickness of such wall between the valve part air and oil openings is equal to the valve travel lost motion before oil is permitted to progressively displace the air as a circulatory fluid. It will also be noted that simultaneously with the movement of the fluid intake control part A the fluid exhaust control part B moves to progressively close the exhaust ports 44ᴱ and their progressively decreasing recesses 44ᴷ and therefore a lesser number of shims installed between the parts A and B than shown in Fig. 3 would cause a retardation of the closure of the exhaust ports 44ᴱ relatively to the air-oil changeover and that an increased number of shims between the valve parts A and B would advance the closing of the exhaust ports relatively to the air-oil changeover. It is thus therefore possible to adjust the phase relationship of the intake-exhaust control assembly of the valve 46 so as to afford a continuous build-up of torque on the driven shaft 23 directly corresponding with the control valve operating lever 100.

Assuming that the control valve 47 is in neutral position as shown in Fig. 3, rotary power applied from a prime mover through a belt drive operatively connected to the pulley 37 of the clutch casing will cause the clutch casing to rotate and assuming that the automatic control adjustment hand-wheel 97 is as shown in the drawings in neutral position and assuming that a known load of 100 pounds is to be elevated by the hoisting cable 91, and assuming that the band brake 27 is engaged to prevent rotation of the hoist drum 16, the operation of my invention may be described as follows:

An inward movement of the latch release rod 99ᴱ will release the foot lock 88ᶜ of the yoke 88 causing its lower end to move slightly downwardly by the slight pull of the slightly tensioned spring 93. The adjustment hand-wheel 97 may then be rotated to tension the spring 93 whereby the pull on the bail 92 causes the yoke 88 and valve operating rod 56 to move toward the right as viewed in Figs. 1 and 3 thereby simultaneously also moving the valve 47 and piston 63 from neutral operation positions and thereby also simultaneously changing the circulatory fluid progressively from air to oil by the outward movement of the valve part A while the valve part B begins to close the discharge ports 44ᴱ and the relief recesses 44ᴷ until the gauge 82 registers 100 pounds cable pull.

The band brake 27 may now be released and the load of 100 pounds will balance the transmitted torque of the clutch. If it is now desired to elevate the load by manual operation of the control system a slight movement of the control valve manual operating lever 100 to the right from its balanced load position (as viewed in Fig. 1) will cause the clutch to develop more torque than is required to balance the load and the load will ascend at a rate established by the magnitude of movement imparted to the operating lever 100. If it is then desired to lower the load, a slight movement of the operating lever 100 to the left from its balanced position will cause the clutch to develop less torque than is required to balance the load and the descending rate may be controlled by the magnitude of movement imparted to the operating lever 100. In instances when a load is balanced in an elevated position and it is then desired to maintain the load in such elevated position for an indefinite period of time, the band brake 27 may be engaged and the operating lever 100 moved to the left to clutch neutral position and locked by latch 99. Load balance may then be re-established by actuating the latch released rod 99ᴱ and upon the release of the band brake 27 the load will remain in suspended balanced position.

The work pressure thus created in the clutch is transmitted to the pressure responsive piston chamber 30ᴱ whereby the fluid pressure against the piston 63 tends to move the valve 47 back to neutral position but the spring 93 counteracts such tendency and tends to move the valve 47 toward closed discharge port position. It will therefore be readily understood that it is this pressure-responsive force of piston 63 versus the force of spring 93 that balances the torque transmitted by the load of 100 pounds to the hoist drum 16; in other words, when the clutch hydraulic torque is equal to the hoist drum demand torque the load on the hoist drum is balanced and remains in stationary position whether suspended from the cable 91 or resting on the ground and a slight manual pull on the cable 91 will raise or lower the load and it will remain stationary in such manually raised or lowered position.

Assuming now that an unknown load is to be elevated by the hoisting cable 91, the torque adjusting hand wheel 97 will be rotated to fully release the tension of spring 93, the latch release rod 99ᴱ shall then be moved to release the foot 88ᶜ of the yoke 88 and the hand wheel 97 then rotated to gradually increase the torque of the clutch until the load is balanced. If then several objects of like weight are to be successively raised and held in balanced positions, the desired value of the torque can be ascertained from the dial indicator of the clutch fluid pressure gauge 82 and the hereinabove outlined procedure for balancing known loads may be employed.

I claim:

1. A hydraulic rotary power transmission and control system including a casing containing a fluid and a gear type power transmitting pump mechanism provided with inlet and outlet ports, a reciprocable valve for controlling flow of fluid through said ports, a rod connected to the valve and extending through a wall of the casing, a small cylindrical chamber within the casing coaxial with the casing and said rod, a piston fixed to the rod reciprocable within the cylindrical chamber, manual operating means for the valve cooperating with the outer end of the rod, there being a small passage through the valve and rod opening at one end into the cylindrical chamber outwardly from the piston, the other end of the passage being positioned to communicate with the outlet port at times when the latter is restricted or closed by the valve.

2. A hydraulic rotary power transmission and control therefor including a hydraulic clutch mechanism provided with an inlet port, a valve cooperating with said port and containing two passages spaced a little apart from each other so that both may be in partial registration with the inlet port at the same time, one passage being adapted to admit air into the port and the other passage being adapted to admit liquid into the port, the valve being movable from an extreme position in which only the passage for air communicates with the port in a direction to bring the passage for liquid into communication with the port, and means to adjust the valve to vary the distance through which the valve must travel from said extreme position before the passage for liquid reaches the port.

3. A rotary hydraulic transmission apparatus including a pump provided with an inlet port, a movable valve adapted to admit air into the port in one position and gradually shut off the delivery of air as the valve moves into a second position, said valve also containing means to begin admitting liquid into the port after it starts to move from the first position and gradually increase the amount thereof thereafter, and means to adjust the valve to vary the time relation between the start of a movement of the valve toward said second position and the beginning of the admission of liquid into said port.

4. A hydraulic rotary power transmission and control system including a rotatable casing containing a hydraulic clutch mechanism; a lengthwise reciprocable rod disposed axially of the casing and extending out through a wall thereof; valve means, including a movable valve member on the inner end of the rod, to cause the torque exerted by the clutch to build up progressively from zero to a variable maximum, as the rod moves from its extreme inward position to its extreme outer position; a stationary support near the outer end of the rod; a member coaxial with the rod slidable lengthwise in said support; a coupling between said member and the rod to prevent relative lengthwise movements but allow relative rotary movements; a yoke mounted on said support and connected to said sliding member; means exerting a yielding pressure on the yoke in a direction to move the rod into its extreme outer position and predetermine the value of the torque to be exerted by the clutch; and means on the casing responsive to the torque exerted by the clutch to move the rod inward when the torque exceeds said predetermined value.

5. A system as set forth in claim 4, wherein the sliding member is a shaft surrounded by a sleeve that is screwed into the stationary support, and which is held against rotation and limited in its lengthwise movements by the sleeve.

6. A system as set forth in claim 4, wherein the yoke has thereon a shoe, and wherein there is a latching device to engage the shoe and hold the yoke in the position corresponding to the extreme inward position of the rod.

7. In combination, a rotatable hydraulic power transmission apparatus having a lengthwise reciprocable valve-moving rod rotatable therewith and projecting therefrom, a stationary support beyond the outer end of the rod, a sleeve coaxial with the rod secured to and adjustable lengthwise in said support, a shaft, somewhat longer than the sleeve, extending through the latter and slidable lengthwise in the same, a head on the forward end of the shaft connected to the rod in a manner to permit relative rotary movements and prevent relative longitudinal movements, a yoke pivoted at one end to said support and extending transversely of and straddling the sleeve, links approximately parallel to the shaft connecting the yoke to the rear end of the shaft, and an actuator connected to the yoke and exerting a yielding force to swing it in one direction, said actuator including a screw and a manually operable member to adjust the same to vary the value of said yielding force.

8. The combination as set forth in claim 7, wherein the pivoted yoke has thereon a long adjustable screw extending lengthwise thereof, and wherein the actuator is connected to one end of that screw.

9. The combination as set forth in claim 7, having, additionally, a pressure gauge near the manually operable member and a flexible conduit leading from the gauge to the head on the forward end of the shaft, and there being a passage leading through the rod from the transmission apparatus and through the said head into communication with the adjacent end of the conduit to cause the gauge to give indications responsive to the pressure in the transmission means.

10. The combination as set forth in claim 7 having, in addition, a hand lever connected to the yoke to move it in either direction at will.

11. A hydraulic coupling comprising a rotatably mounted cylindrical casing provided with driving means therefor and having a chamber therein adapted to contain fluid; a driven element; a gear pump variety power transmission mechanism in the casing arranged operatively to connect the casing and element and embodying a sun gear connected to the driven element, a planetary pinion meshing with the sun gear, and a rotary carrier in the casing connected to the casing, provided at the outer margin thereof with a pinion retaining cavity facing the sun gear, and having an inlet duct between the casing interior and the suction side of the pinion and an outlet duct between the pressure side of the pinion and the casing interior; a valve in said chamber for controlling the outlet duct; a second chamber extending axially beyond one end of said first-mentioned chamber; and mechanism operative automatically during operation of the clutch to actuate the valve so as to maintain a substantially constant transmitted torque so far as the driven element is concerned and embodying a piston spaced apart from said valve slidably mounted within said second chamber and operatively connected to the valve, means establishing communication between the outlet duct and one side of the piston whereby the piston is subjected to variations in the static pressure of the fluid in said outlet duct, and means for subjecting the piston to a substantially constant force in opposition to the pressure against the piston, said last mentioned means being adjustable from the outside of the casing and while the coupling is in operation in order to vary the force against the piston and resultantly vary the magnitude of the transmitted torque.

12. A hydraulic coupling comprising a rotatably mounted cylindrical casing provided with driving means therefor and adapted to contain fluid; a driven element; a gear pump variety power transmission mechanism in the casing arranged operatively to connect the casing and element and embodying a sun gear connected to the driven element, a plurality of planetary pinions meshing with the sun gear, and a rotary carrier in the casing connected to the casing, provided at the outer margin thereof with pinion retaining cavities facing the sun gear, and having inlet ducts between the casing interior and the suction sides of the pinions, and outlet ducts between the pressure sides of the pinions and the casing interior; a single valve for controlling all of the outlet ducts; and mechanism operative automatically during operation of the clutch to actuate the valve so as to maintain a substantially constant transmitted torque so far as the driven element is concerned and embodying a slidably mounted piston operatively connected to the valve, means establishing communication between all of the outlet ducts and one side of the piston whereby the piston is subjected to variations in the static pressure of the fluid in said outlet ducts, and means for subjecting the piston to a substantially constant force in opposition to the pressure of the fluid against the piston, embodying a movably supported member positioned exteriorly of the casing and operatively connected to the piston and a spring connected at one end to said member and at its opposite end to an adjustable instrumentality whereby said spring is mounted for adjustment relatively to said member for selectively varying the force against the piston and resultantly the magnitude of the transmitted torque.

13. A hydraulic rotary power transmission and control system as set forth in claim 1 and including adjustable means for varying the axial distance between said valve and said piston.

14. A control system for a fluid type rotary power transmission having a rotatable casing containing a plurality of fluid-circulating power-transmitting elements and a fluid-containing chamber and a valve in said fluid chamber for controlling circulation of fluid between said fluid chamber and said power-transmitting elements for progressively varying the driving force exerted by said power-transmitting elements between a minimum when said valve is in one position and a selected maximum when said valve is in a second position comprising: actuating means disposed extraneously of said casing exerting a predetermined yieldable pressure, determined by the driving force desired, on said valve to hold it in its said second position, and automatically operable means, carried on said casing, responsive to the force that is being exerted by the transmission comprising a fluid pressure chamber independent of said fluid chamber, a piston axially spaced from said valve and movably mounted in said fluid pressure chamber, a rod connecting said piston with said valve adapted to move said valve from its said second position toward the first position when said force exceeds that corresponding to said predetermined pressure, including fluid passage means establishing communication through said valve and said rod between the pressure side of the fluid circuit of said power-transmitting elements and one side of said piston.

15. A hydraulic rotary power transmission apparatus having a rotatable casing containing a hydraulic clutch mechanism and a controlling valve therefor, a reciprocable rod connected to the valve and extending axially of the casing through a wall thereof, an actuator cooperating with the outer end of the rod and including adjustable means adapted for exerting a yieldable pressure against said rod and valve in one direction, and means other than said valve responsive to fluid pressure in the clutch mechanism adapted to move said rod and said valve in the opposite direction against the resistance of the actuator when said fluid pressure exceeds a predetermined value, said means other than said valve including a piston connected with said rod and means for adjustably varying the axial distance between said piston and said valve.

JOHN R. THOMAS.

REFERENCES CITED

The following references are of record in the file of this patent:

UNITED STATES PATENTS

| Number | Name | Date |
|---|---|---|
| 1,388,311 | Russell | Aug. 23, 1921 |
| 1,688,852 | Christie | Oct. 23, 1929 |
| 1,797,407 | Everstam | Mar. 24, 1931 |
| 2,076,887 | Gambrell | Apr. 13, 1937 |
| 2,396,149 | Bock | Mar. 5, 1946 |